United States Patent
Hagen et al.

(10) Patent No.: US 6,624,721 B1
(45) Date of Patent: Sep. 23, 2003

(54) APPARATUS FOR ACQUIRING A SIGNAL FROM AN INTERMEDIATE POINT ON A SERIES IMPEDANCE SOURCE TERMINATED UNIDIRECTIONAL TRANSMISSION LINE

(75) Inventors: Michael S. Hagen, Portland, OR (US); Einar O. Traa, Portland, OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/687,979

(22) Filed: Oct. 13, 2000

(51) Int. Cl.[7] ............................................. H03H 7/38
(52) U.S. Cl. ................................... 333/112; 333/119
(58) Field of Search ............................... 333/109, 112, 333/119; 324/127

(56) References Cited

U.S. PATENT DOCUMENTS

| | | | |
|---|---|---|---|
| 3,872,408 A | * 3/1975 | Reilly | 333/112 |
| 4,158,810 A | * 6/1979 | Leskovar | 324/127 |
| 4,311,974 A | * 1/1982 | Reddy | 333/112 |
| 5,008,633 A | * 4/1991 | Hom | 333/109 |
| 5,058,198 A | * 10/1991 | Rocci et al. | 333/109 |
| 6,066,994 A | * 5/2000 | Shepherd et al. | 333/109 |

* cited by examiner

*Primary Examiner*—Seungsook Ham
(74) *Attorney, Agent, or Firm*—Thomas F. Lenihan

(57) ABSTRACT

Apparatus for monitoring a signal at an intermediate point on a series impedance source terminated unidirectional transmission line employs a voltage probe, a current probe, and a summing element. The apparatus provides a useful output signal despite the fact that signals at an intermediate point on the transmission line comprise the sum of incident and reflected waveforms. The voltage probe derives a signal from the transmission line that is representative of the sum of the incident and reflected waveforms. The current probe produces a voltage signal representative of the difference between the incident and reflected waveform currents. The summing circuit algebraically adds the output signals of the voltage and current probes, and produces an output signal representative of only one of the transmitted waveform or the reflected waveform.

4 Claims, 2 Drawing Sheets

APPARATUS FOR ACQUIRING A SIGNAL FROM AN INTERMEDIATE POINT ON A SERIES IMPEDANCE SOURCE TERMINATED UNIDIRECTIONAL TRANSMISSION LINE

FIELD OF THE INVENTION

The subject invention generally concerns measurement of signals on a transmission line, and specifically concerns measurement of signals at an intermediate point of a source-terminated transmission line.

BACKGROUND OF THE INVENTION

It is well known in the electronics industry to terminate a unidirectional signal transmission line (i.e., unidirectional bus) at the source end with a series impedance equivalent to the impedance of the transmission line. Series impedance source termination of unidirectional transmission lines is commonly-used by circuit design engineers because it provides a signal at the data receiver end of the transmission line that is a true representation of the signal produced at the source end of the transmission line.

Often, test engineers need to monitor signals on such buses to acquire data for use in troubleshooting the circuitry. Unfortunately, probing such a series impedance source terminated transmission line is problematic, because a signal transmitted down a transmission line by a source amplifier will reflect from the receiver end, and propagate back up the transmission line. That is, the voltage signal at any point on the line is the sum of an incident waveform component and a reflected waveform component. Thus, a signal observed at most points on the transmission line is not a true representation of the transmitted signal. As noted above, the one exception is at the far end of the line, at the input of the data receiver. Unfortunately, in many cases the input terminal of the data receiver is not accessible for probing.

What is needed is an apparatus and method which allow monitoring of a series impedance source terminated unidirectional transmission line at any point along the line and which produces at an output a signal representative of only one of the incident waveform or the reflected waveform.

SUMMARY OF THE INVENTION

Apparatus for monitoring a signal at an intermediate point on a series impedance source terminated unidirectional transmission line employs a voltage probe, a current probe, and a summing circuit. The voltage probe derives a signal from the transmission line that is representative of the sum of the incident and reflected voltage waveforms. The current probe produces a voltage signal representative of the difference between the incident and reflected waveform currents. The summing circuit algebraically adds the output signals of the voltage and current probes, and produces an output signal representative of only one of the transmitted waveform or the reflected waveform.

DETAILED DESCRIPTION OF THE DRAWING

Figure 1:
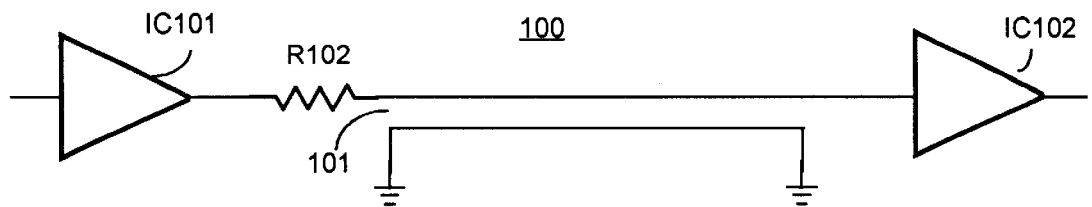
FIG. 1 shows, in schematic form, a series impedance source terminated unidirectional transmission line according to the prior art.

FIG. 1 shows a series impedance source terminated unidirectional transmission line arrangement, generally designated 100, as known from the prior art. A source Transmitter Amplifier IC101 applies a signal to a Transmission Line 101 through a series resistor R102. The value of series resistor R102 is chosen to be equal to the nominal impedance ($Z_0$) of the transmission line. As noted above, the signal developed at an input terminal of a Data Receiver Amplifier IC102 is a true representation of the transmitted signal. However, the observed voltage waveform at any intermediate point on the transmission line is the sum of the incident and reflected waveforms, and therefore is not a true representation of the transmitted waveform.

Figure 2:
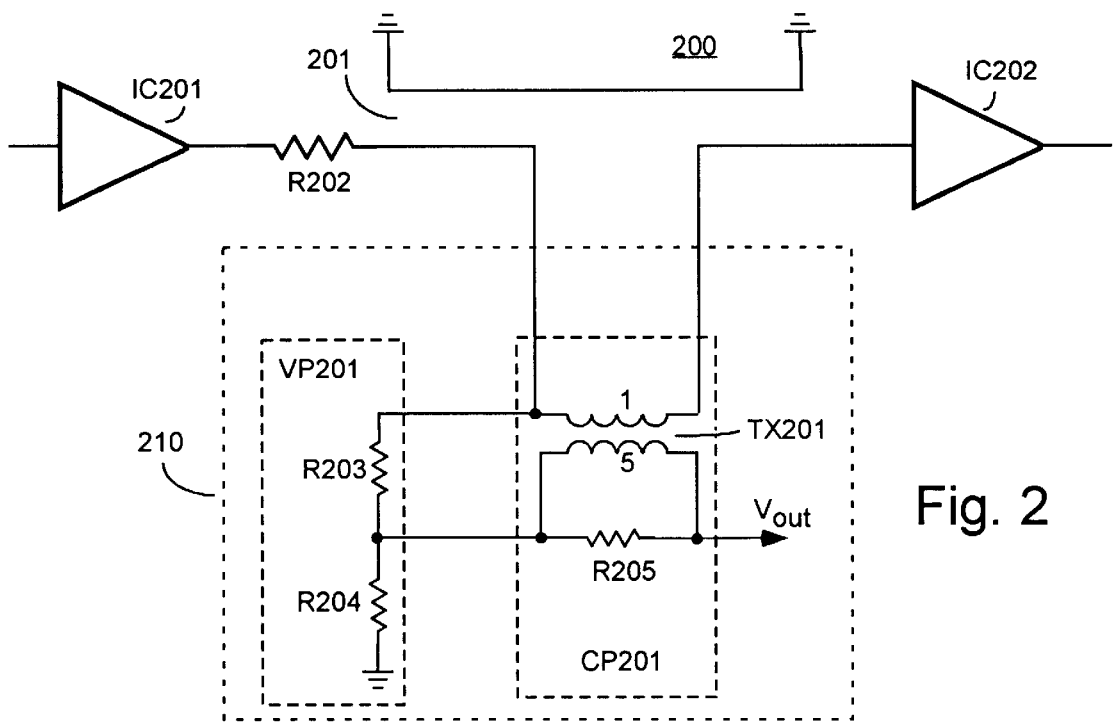
FIG. 2 shows, in schematic form, apparatus for monitoring the transmission line of FIG. 1 at an intermediate point, in accordance with a first embodiment of the subject invention.

FIG. 2 shows a series impedance source terminated unidirectional transmission line arrangement generally designated 200, in which a source Transmitter Amplifier IC201 applies a signal to a Transmission Line 201 through a series resistor R202. The value of series resistor R202 is again chosen to be equal to the nominal impedance ($Z_0$) of the transmission line.

Once again, the signal developed at an input terminal of a Data Receiver Amplifier IC202 is a true representation of the transmitted signal. However, the apparatus of FIG. 2, unlike that of the prior art, also derives a true representation of the transmitted waveform from a waveform acquired at an intermediate point on the transmission line by operation of a circuit arrangement 210.

Referring to FIG. 2, circuit arrangement 210 includes three elements: a Voltage Probe VP201 comprising series-connected resistors R203 R204, a Current Probe CP201 comprising a signal transformer TX201, and a Combining Element (i.e. summing resistor) comprising a resistor R205. A primary winding of transformer TX201 is placed in series with transmission line 201. The secondary winding of transformer TX201 is connected across summing resistor R205 to develop an output voltage proportional to the current through the primary winding. Resistors R203 and R204 of Voltage Probe VP201 form a voltage divider according to their resistance ratios. Resistor R203 has a value of 4K ohms and resistor R204 has a value of 1K ohm. Thus, one-fifth of the voltage sensed at Transmission Line 201 will be developed at the center point of the voltage divider.

Transformer TX201 of Current Probe CP201, has a turns ratio of 1:5 from primary to secondary. Thus, a signal having a magnitude equal to one-fifth of the current flowing in Transmission Line 201 will be applied to summing resistor R205, there to be combined with the output voltage of voltage divider R203, R204. Summing Resistor R205 must have a resistance equal to the characteristic impedance of Transmission Line 201 (i.e., 50 ohms). It should be noted that, in this embodiment, resistor R205 serves two functions. It serves as the load resistor for Transformer TX201 (and thus is part of the Current Probe Element) and also serves as the Combining Element for combining the signals from the voltage and current probes. Resistor R205 develops a voltage across it that is directly proportional to the current through it. Thus, the current supplied by the secondary winding of transformer TX201 is converted to a voltage to be summed with the voltage from Voltage Probe VP201.

It is herein recognized that the voltage observed at an intermediate point of Transmission Line 201 is the sum of the incident and reflected waveforms, and that the current observed at the same point is the difference between the incident and reflected voltage waveforms. Thus, combining the signals at the outputs of Voltage Probe VP201 and Current Probe CP201 provides cancellation of either the incident waveform or the reflected waveform, and provides a resultant signal that is useful for monitoring signals on Transmission Line 201. That is, when either the incident waveform or the reflected waveform is cancelled, a true representation of the transmitted waveform remains. The apparatus of FIG. 2 cancels the reflected waveforms of signals transmitted by Transmitter Amplifier IC201.

In mathematical terms, the subject apparatus operates in accordance with the following equation EQ1.

EQ1:

$$V_{Out} = \frac{1}{K_1}[V_{Incident} + V_{Reflected}] + \frac{R_{Load}}{K_2}[I_{Incident} - I_{Reflected}]$$

$$V_{Out} = \frac{V_{Incident}}{K_1} + \frac{R_{Load} \cdot I_{Incident}}{K_2} \Rightarrow \frac{2}{K_1}V_{Incident} \text{ if } K_1 = K_2$$

Where: $R_{Load}$=R205=R202=$Z_0$=50 ohms, $$K_1 = \frac{R203 + R204}{R204} = 5$$

$K_2$=the turns ratio of transformer TX201 (i.e., 5); and $$\frac{R205}{K_2} \cdot K_1 = Z_0$$

Figure 3:
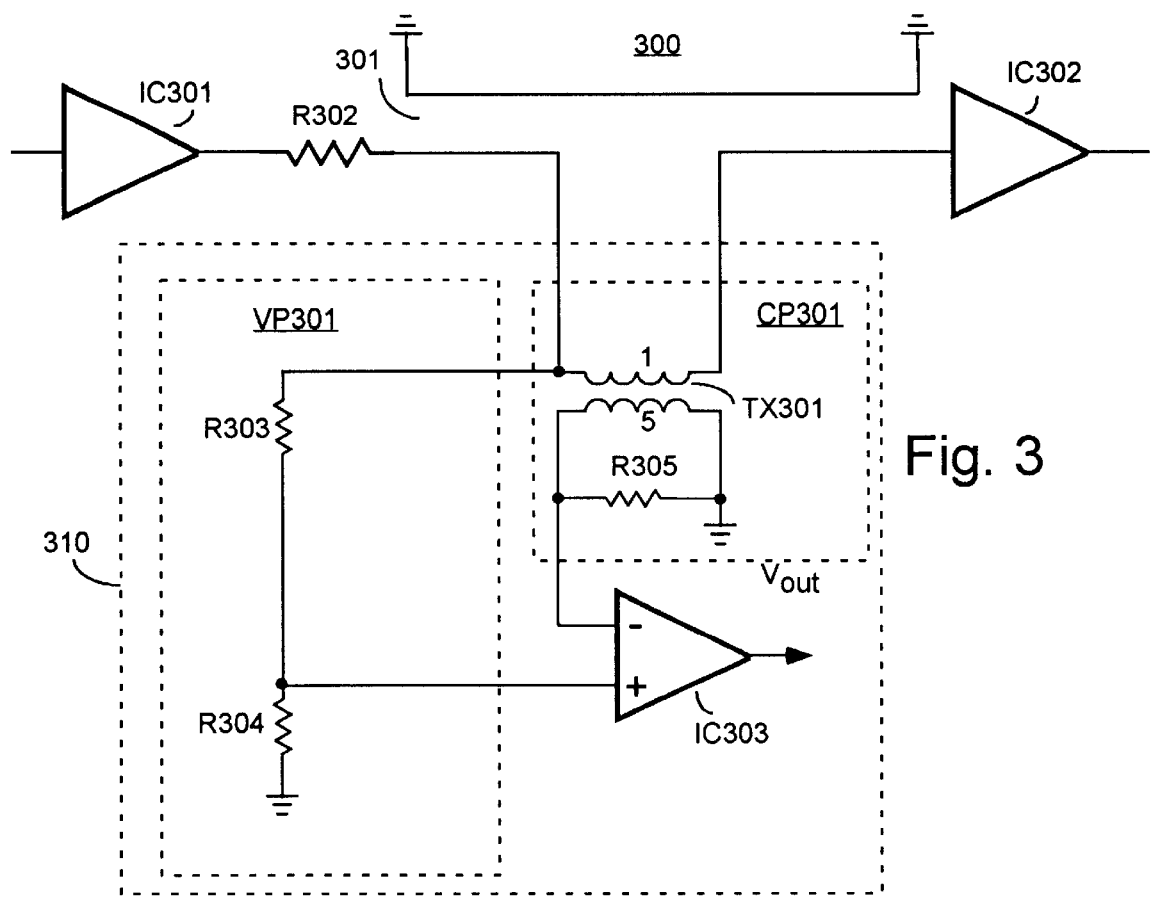
FIG. 3 shows, in schematic form, apparatus for monitoring the transmission line of FIG. 1 at an intermediate point, in accordance with a second embodiment of the subject invention.

FIG. 3 shows a second embodiment of the invention in which the difference of the output signals of the voltage and current probes is used, thus producing a signal representing only the reflected waveform. Referring to FIG. 3, circuit arrangement 310 includes three elements: a Voltage Probe VP301 comprising series-connected resistors R303, R304, a Current Probe CP301 comprising a signal transformer TX301, and a Combining Element comprising a current probe load resistor R305, and a Summing Amplifier IC303. A primary winding of transformer TX301 is placed in series with Transmission Line 301. The secondary winding of transformer TX301 is connected across load resistor R305 to develop an output voltage proportional to the current through the primary winding. Resistors R303, R304 of Voltage Probe VP301 form a voltage divider according to their resistance ratios. Resistor R303 has a value of 4K ohms and resistor R304 has a value of 1K ohm. Thus, one-fifth of the voltage sensed at Transmission Line 301 will be developed at the center point of the voltage divider.

Transformer TX301 of Current Probe CP301, has a turns ratio of 1:5 from primary to secondary. Thus, a signal having a magnitude equal to one-fifth of the current flowing in Transmission Line 301 will be applied to load resistor R305. Load resistor R305 is coupled across the secondary winding of Transformer TX301. Load resistor R305 has one end coupled to ground potential, and the other end coupled to the inverting (i.e. −) input of Summing Amplifier IC303. Load Resistor R305 must have a resistance equal to the characteristic impedance of Transmission Line 301 (i.e., 50 ohms). Resistor R305 develops a voltage across it that is directly proportional to the current through it. Thus, the current supplied by the secondary winding of transformer TX301 is converted to a voltage to be summed with the voltage from Voltage Probe VP301. The output voltage of voltage divider R303, R304 is applied to the non-inverting (i.e. +) input of Summing Amplifier IC303. Thus, the output of Current Probe CP301 will be subtracted from the output of Voltage Probe VP301 by Summing Amplifier IC303 which produces a resultant signal at its output terminal that is representative of only the reflected waveform.

In mathematical terms, the subject apparatus operates in accordance with the following equation EQ2.

EQ2:

$$V_{Out} = \frac{1}{K_1}[V_{Incident} + V_{Reflected}] - \frac{R_{Load}}{K_2}[I_{Incident} - I_{Reflected}]$$

$$V_{Out} = \frac{V_{Reflected}}{K_1} + \frac{R_{Load} \cdot I_{Reflected}}{K_2} \Rightarrow \frac{2}{K_1}V_{Reflected} \text{ if } K_1 = K_2$$

Where: $R_{Load}$=R305=R302=$Z_0$=50 ohms, $$K_1 = \frac{R303 + R304}{R304} = 5$$

$K_2$=the turns ratio of transformer TX301 (i.e., 5); and $$\frac{R305}{K_2} \cdot K_1 = Z_0$$

It should be noted that in the arrangements of FIGS. 2 and 3, the time constant (L/R) of transformer TX201, TX301 must be much greater than the round trip time of the transmission line 201, 301.

It is herein recognized that because the incident and reflected waveforms are substantially identical, a user will receive the same information by observing a resultant signal corresponding to either one of them. A major advantage of the subject apparatus is that it provides the capability to observe the resultant signal instead of observing a signal at an intermediate point on the transmission line that is necessarily distorted because it comprises the sum of the incident and reflected waveforms.

One skilled in the art will realize that circuitry 210, 310 can be permanently designed into the circuit board of the device under test, thereby making it unnecessary to physically cut circuit board traces to install the primary winding of transformer TX201, TX301 in series with the transmission line.

It should be noted that the 5:1 ratios mentioned in the description are merely for exemplary purposes, and that other ratios, used to implement the invention, will work also.

What has been described is a circuit arrangement useful for monitoring a series impedance terminated unidirectional transmission line at an intermediate point and providing an output signal representative of only one of either the incident waveform or the reflected waveform. Such a circuit is useful for providing the monitored signals to a logic analyzer, an oscilloscope, or the like.

It is herein recognized that the disclosed circuitry, including the novel Voltage Probe and Current Probe arrangement, can be integrated onto an IC, and the following claims are intended to cover that situation.

What is claimed is:

1. Apparatus for monitoring signals at an intermediate point of a series impedance source terminated unidirectional transmission line, said signals of said transmission line including an incident waveform component and a reflected waveform component, said apparatus comprising:

a voltage probe coupled to said intermediate point on said transmission line for monitoring a voltage signal on said transmission line and producing a first output signal in response thereto;

a current probe coupled in series with said transmission line at said intermediate point on said transmission line for monitoring a current flowing in said transmission line and producing a second output signal in response thereto; and a combining circuit for combining said first and second output signals to produce a resultant signal at an output, said resultant signal being representative of only one of said incident waveform component and said reflected waveform component;

said voltage probe comprises a voltage divider circuit for developing said first output signal and applying said first output signal to said combining circuit;

said current probe comprises a transformer having a primary winding and a secondary winding, said primary winding being coupled in series with said transmission line, said secondary winding developing said second output signal and applying said second output signal to said to said combining circuit; and said combining circuit algebraically sums said first and second output signals and produces said resultant signal in response thereto; and wherein, said combining circuit is an amplifier having inverting and non-inverting inputs, and said first output signal is coupled to said non-inverting input and said second output signal is coupled to said inverting input, and said amplifier produces said resultant signal at an output, said resultant signal being representative of only said reflected waveform component.

2. The apparatus of claim 1 further including, a load resistor coupled across said secondary winding of said transformer for developing said second output signal.

3. Apparatus for monitoring signals at an intermediate point of a series impedance source terminated unidirectional transmission line arrangement, said transmission line arrangement including, in the order named, a series connection of a source amplifier, a termination resistor, a transmission line, and a receiver amplifier, said signals of said transmission line including an incident waveform component and a reflected waveform component, said apparatus comprising:

a voltage probe coupled to said intermediate point on said transmission line for monitoring a voltage signal on said transmission line and producing a first output signal in response thereto, said intermediate point being a point between a junction of said termination resistor and said transmission line and an input of said receiver amplifier;

a current probe coupled in series with said transmission line at said intermediate point on said transmission line for monitoring a current flowing in said transmission line and producing a second output signal in response thereto; and a combining circuit for combining said first and second output signals to produce a resultant signal at an output, said resultant signal being representative of only one of said incident waveform component and said reflected waveform component;

said voltage probe comprises a voltage divider circuit for developing said first output signal and applying said first output signal to said combining circuit;

said current probe comprises a transformer having a primary winding and a secondary winding, said primary winding being coupled in series with said transmission line, said secondary winding developing said second output signal and applying said second output signal to said to said combining circuit;

said combining circuit algebraically sums said first and second output signals and produces said resultant signal in response thereto; and wherein, said combining circuit is an amplifier having inverting and non-inverting inputs, and said first output signal is coupled to said non-inverting input and said second output signal is coupled to said inverting input, and said amplifier produces said resultant signal at an output, said resultant signal being representative of only said reflected waveform component.

4. The apparatus of claim 3 further including, a load resistor coupled across said secondary winding of said transformer for developing said second output signal.

* * * * *